US011393333B2

(12) United States Patent
Lau et al.

(10) Patent No.: US 11,393,333 B2
(45) Date of Patent: Jul. 19, 2022

(54) CUSTOMIZABLE TRAFFIC ZONE

(71) Applicants: AT&T Intellectual Property I, L.P., Atlanta, GA (US); AT&T Mobility II LLC, Atlanta, GA (US)

(72) Inventors: Erie Lai Har Lau, Redmond, WA (US); Hendrawan Susanto, Issaquah, WA (US); Reza Hussain Hussaini, Redmond, WA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 273 days.

(21) Appl. No.: 16/692,387

(22) Filed: Nov. 22, 2019

(65) Prior Publication Data

US 2021/0158688 A1 May 27, 2021

(51) Int. Cl.
*G07B 15/00* (2011.01)
*G08G 1/01* (2006.01)
(Continued)

(52) U.S. Cl.
CPC .......... *G08G 1/012* (2013.01); *G07B 15/063* (2013.01); *G08G 1/0129* (2013.01); *G08G 1/091* (2013.01); *H04W 4/022* (2013.01)

(58) Field of Classification Search
CPC ...... G08G 1/012; G08G 1/0129; G08G 1/091; G08G 1/0116; G08G 1/0133;
(Continued)

(56) References Cited

U.S. PATENT DOCUMENTS 5,660,547 A 8/1997 Copperman
6,317,686 B1 11/2001 Ran
(Continued)

FOREIGN PATENT DOCUMENTS

| CN | 102509365 A | 6/2012 |
| JP | 2007-219785 A | 8/2007 |
| JP | 2019133366 A | 8/2019 |

OTHER PUBLICATIONS

Abdi et al.,"In-Vehicle Augmented Reality Traffic Information System: A New Type of Communication Between Driver and Vehicle", Article in Procedia Computer Science, Dec. 2015, pp. 242-249.
(Continued)

*Primary Examiner* — Anh V La
(74) *Attorney, Agent, or Firm* — Amin, Turocy & Watson, LLP

(57) ABSTRACT

The described technology is generally directed towards customizable traffic zones that work with wireless communication network, and can be configured based on various data, including traffic data. A vehicle and/or wireless communication network user device within the traffic zone facilitate monitoring of the vehicle/user device. Pricing can be based on entering and exiting the zone, dwell time in the zone, user profile data and other factors such as time of day, day of week and so forth. A customizable traffic zone can be configured and reconfigured as needed, such as to expand or contract a zone, exclude an area, and so forth. User devices can be targeted, including geo-fencing for warning users about to enter a traffic zone that charges for usage, or to provide other relevant messages.

20 Claims, 14 Drawing Sheets

(51) Int. Cl.
  *G07B 15/06*  (2011.01)
  *H04W 4/021*  (2018.01)
  *G08G 1/09*  (2006.01)

(58) Field of Classification Search
  CPC .... G08G 1/0141; G08G 1/017; G08G 1/0175;
        G08G 1/207; G07B 15/063; H04W 4/022;
        H04W 4/021; H04W 4/029; H04W 4/44;
                                    H04L 67/306
  USPC ........... 340/928, 933, 934, 988, 989; 705/13
  See application file for complete search history.

(56) References Cited

U.S. PATENT DOCUMENTS

| | | |
|---|---|---|
| 6,705,521 B1 | 3/2004 | Wu et al. |
| 7,127,413 B1 | 10/2006 | Yanagisawa et al. |
| 7,155,376 B2 | 12/2006 | Yang et al. |
| 7,181,414 B1 | 2/2007 | Ogawa et al. |
| 7,274,311 B1 | 9/2007 | Macleod |
| 7,865,391 B2 | 1/2011 | Martinez-Olague et al. |
| 8,718,910 B2 | 5/2014 | Gueziec |
| 9,652,888 B1 | 5/2017 | Johnson et al. |
| 10,768,629 B2 | 9/2020 | Song et al. |
| 2002/0198694 A1 | 12/2002 | Yang et al. |
| 2004/0143385 A1 | 7/2004 | Smyth et al. |
| 2005/0086100 A1* | 4/2005 | Yanagisawa ........... G07B 15/02 705/13 |
| 2006/0129315 A1 | 6/2006 | Kanematsu |
| 2007/0093997 A1 | 4/2007 | Yang et al. |
| 2007/0225912 A1 | 9/2007 | Grush |
| 2007/0271079 A1 | 11/2007 | Oguchi et al. |
| 2010/0070253 A1 | 3/2010 | Hirata et al. |
| 2010/0076878 A1 | 3/2010 | Burr et al. |
| 2010/0097240 A1 | 4/2010 | Soulchin et al. |
| 2010/0134320 A1* | 6/2010 | Chevion ................ G08G 1/164 340/932 |
| 2010/0225644 A1 | 9/2010 | Swope, III et al. |
| 2011/0106370 A1 | 5/2011 | Duddle et al. |
| 2012/0109506 A1 | 5/2012 | Fei et al. |
| 2014/0278052 A1 | 9/2014 | Slavin et al. |
| 2014/0310075 A1 | 10/2014 | Ricci |
| 2015/0088618 A1 | 3/2015 | Basir et al. |
| 2015/0120455 A1* | 4/2015 | McDevitt ........... G06Q 30/0261 705/14.58 |
| 2015/0242944 A1 | 8/2015 | Willard et al. |
| 2015/0319093 A1 | 11/2015 | Stolfus |
| 2017/0011559 A1* | 1/2017 | Graham ............... G08G 1/0133 |
| 2018/0203455 A1 | 7/2018 | Cronin et al. |
| 2018/0309592 A1 | 10/2018 | Stolfus |
| 2018/0349526 A1 | 12/2018 | Atsmon et al. |
| 2019/0011931 A1 | 1/2019 | Selvam et al. |
| 2019/0311077 A1 | 10/2019 | Watanabe et al. |
| 2020/0033866 A1 | 1/2020 | Song et al. |
| 2020/0211409 A1 | 7/2020 | Latorre et al. |
| 2020/0234582 A1 | 7/2020 | Mintz |
| 2020/0334920 A1* | 10/2020 | London .............. G06Q 30/0284 |
| 2020/0409380 A1 | 12/2020 | Song et al. |
| 2021/0019376 A1 | 1/2021 | Neubauer |
| 2021/0020038 A1 | 1/2021 | Weldemariam et al. |
| 2021/0158311 A1 | 5/2021 | Hussaini et al. |
| 2021/0158688 A1 | 5/2021 | Lau et al. |
| 2021/0201679 A1 | 7/2021 | Kuwahara |
| 2021/0217307 A1 | 7/2021 | Abdel-Aty et al. |
| 2021/0233394 A1 | 7/2021 | Sakaki Bara et al. |

OTHER PUBLICATIONS

Chun et al., "Virtual-Reality Based Integrated Traffic Simulation for Urban Planning", International Conference on Computer Science and Software Engineering, 2008, 4 pages.

Chao et al.,"A Survey on Visual Traffic Simulation: Models, Evaluations, and Applications in Autonomous Driving" vol. 38 No. 2, 2019, 22 pages.

Goedicke et al., "VR-OOM: Virtual Reality on-road driving siMulation", DOI: https://doi org/10.1145/3173574.3173739, Apr. 21-26, 2018, 11 pages.

Maroto et al., "Real-Time Traffic Simulation With a Microscopic Model", IEEE Transactions on Intelligent Transportation Systems, vol. 7, No. 4, Dec. 2006, pp. 513-527.

Kobayashi et al., "Virtual Driving", pp. 336-347.

Wikkie et al.,"Virtualized traffic at metropolitan scales", Frontiers in Robotics and AI vol. 2 Article 11, May 7, 2015, 10 pages.

Bayarri et al., "Driving Simulation", Communications of the ACM, vol. 39, No. 5, May 1996, 6 pages.

Decrescenzo, "Request for Technology-19-65 Congestion Pricing Alternative Technology," MTA Bridges and Tunnels, Mar. 28, 2019, 7 pages.

Non-Final Office Action received for U.S. Appl. No. 16/692,441 dated Oct. 13, 2021, 47 pages.

Non-Final Office Action received for U.S. Appl. No. 16/692,481 dated Sep. 24, 2021, 135 pages.

Final Office Action received for U.S. Appl. No. 16/692,441 dated Mar. 10, 2022, 79 pages.

Final Office Action received for U.S. Appl. No. 16/692,481 dated Jan. 27, 2022, 79 pages.

Non-Final Office Action received for U.S. Appl. No. 16/692,481 dated May 26, 2022, 44 pages.

Ding, Heng, Zheng, Xiao-yan, Zhang, Yu, Zhu, Liang-yuan, and Zhang, Wei-hua, "Optimal Control for Traffic Congested Area Boundary in Macroscopic Traffic Network," Zhongguo Gonglu Xuebao/China Journal of Highway and Transport, vol. 30, No. 1, Jan. 2017, pp. 111-120.

* cited by examiner

CUSTOMIZABLE TRAFFIC ZONE

TECHNICAL FIELD

The subject application is related to wireless communication systems, and more particularly to using wireless communication systems to control and monitor traffic.

BACKGROUND

Toll roads and other tolling schemes (e.g., for bridge usage) have long provided a way for governmental and government-related entities to collect money from those who use the roads, often to help initially pay for and then maintain such infrastructure. A more recent development is the concept of charging fees based on traffic congestion, which in general charges vehicles based on traffic conditions no matter what time of the day in an effort to reduce traffic, reduce pollution and raise revenue.

For example, Singapore and London have such congestion pricing schemes. Singapore uses electronic transponders mounted in the vehicles that are detected by sensors mounted on road infrastructure, along with camera support to capture license plate images. London's congestion pricing relies on cameras (on the order of several hundred) and automatic license plate recognition.

Electronic sensors and cameras are mounted on dedicated infrastructure, which can be costly to install and maintain, and are generally fixed in their locations. Cameras are also relatively resource intensive with respect to transmitting and image processing a large amount of image data. Moreover, automatic license plate recognition is quite often unreliable (having approximately a twenty percent error rate), whereby expensive manual labor is used to correct inaccurate license plate readings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
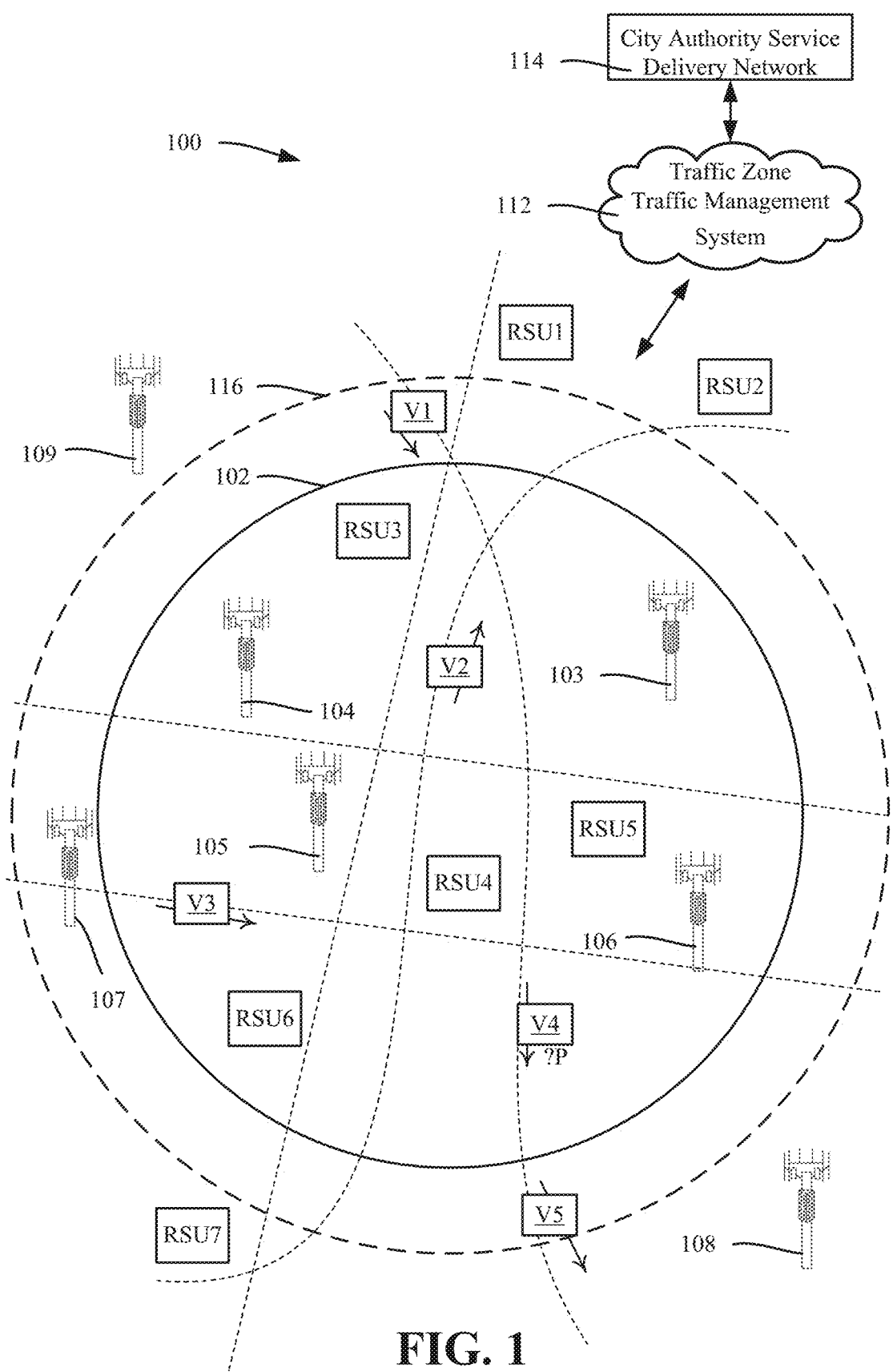
FIG. 1 illustrates an example customizable traffic zone that uses a wireless communication system, vehicle sensors and vehicle user equipment, in accordance with various aspects and implementations of the subject disclosure.

Briefly, one or more aspects of the technology described herein are generally directed towards creating a customizable traffic zone based in part on sensing vehicle locations using a wireless communications network. The wireless communication network sensing can be used in conjunction with other sensory networks, such as roadside units that can determine the amount of traffic congestion and vehicle types, for example. The technology facilitates monitoring a vehicle within a traffic zone, as well as monitoring the presence of a particular user identity within the vehicle. As will be understood, zone usage pricing can be implemented based on the monitoring, and can be varied based on a number of factors as described herein.

Moreover, the wireless communications network facilitates varying a traffic zone's boundaries, without changing supporting infrastructure. For example, a traffic zone can be specified based on one set of criteria, such as time of day and traffic congestion, and that traffic zone can be expanded or contracted as the criteria changes.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device," smart device," "user equipment," "mobile device equipment," "mobile station," "mobile," subscriber station," "access terminal," "terminal," "handset," "communication device," (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example system 100 comprising a customizable traffic zone 102 created in accordance with various aspects and embodiments of the subject technology. FIG. 1 illustrates the customizable traffic zone 102 in the shape of a circle, however any area can be defined (to a reasonable accuracy) as a traffic zone, including a circle, oval, any regular or irregular polygon, as well as areas that include smaller exclusion or otherwise differing areas (such as a square block within a ten square block area). In FIG. 1, the closely dashed lines curved and straight lines represent roads that any number of vehicles (five such vehicles V1-V5 are depicted) may be traveling on or parked. Note that the vehicle direction is detected by the system and in FIG. 1 is represented by the respective arrow accompanying the respective block that represents a vehicle; the vehicle V4 was traveling in a certain direction but has not moved recently and thus is detected by the system 100 as likely being parked, as represented by the "?P" label in FIG. 1.

As will be understood, the technology is based on a wireless communication system, as represented in FIG. 1 via cell sites/base stations 102-109, that communicate with user equipments in the vehicles. Note that while eight such cell sites/base stations 102-109 are depicted, it is understood that any practical number of such sites may be present in a given scenario.

In general, the cell sites/base stations 102-109 monitor the location of the vehicle, based on a user equipment (typically a driver's cell phone or a more dedicated wireless user equipment device such as a device within the vehicle) and thus can determine whether a vehicle is present within a defined traffic zone. It should be noted that global positioning systems (GPS) are useful, but do not provide a viable solution in many scenarios because, for example, GPS does not function well in "urban canyons" where traffic monitoring as described herein is most likely to be implemented.

Further, not every user equipment has GPS capabilities, or often has GPS turned off. RSU detection and timing-based user equipment location can be used in such scenarios.

Roadside units RSU1-RSU7 are also shown in FIG. 1 (sometimes referred to as roadside equipment, or RSE); any practical number may be present in a given implementation. Such roadside units are already commercially available, and are not described herein in detail, except to note that the roadside units RSU1-RSU7 can detect and report the amount of traffic and the speed of traffic and general information regarding the type of vehicle data. If a vehicle includes a transponder device, more specific information regarding the vehicle type may be detected. Note that the roadside units RSU1-RSU7 may comprise edge gateway devices to facilitate faster operations and reduced data transmission for real time or near-real time system 100 operation.

As shown in FIG. 1, the cell sites/base stations 102-109 and roadside units RSU1-RSU7 communicate with a traffic zone management system 112, which in turn communicates with a city (or other governmental such as county) authority service delivery network 114. Additional details of the traffic zone management system 112 and the city authority service delivery network 114 are described with reference to FIGS. 4-6.

Also shown in FIG. 1 is the concept of a warning zone 116. Vehicles detected in the warning zone 116 that are approaching the traffic zone 102 can be notified that they are about to enter the traffic zone 102, particularly for traffic zones that charge a price for vehicle operation therein. Thus, the approaching vehicle V1 receives such a warning, while the departed vehicle V5 does not. A user equipment within the vehicle can provide the warning, e.g., on a display and/or audibly, and can also show the estimated price for entering the zone 102. A displayed and/or audible message can be given to the user equipment in vehicle V5 indicating that the vehicle has left the zone, possibly along with the price charged.

Figure 2A:
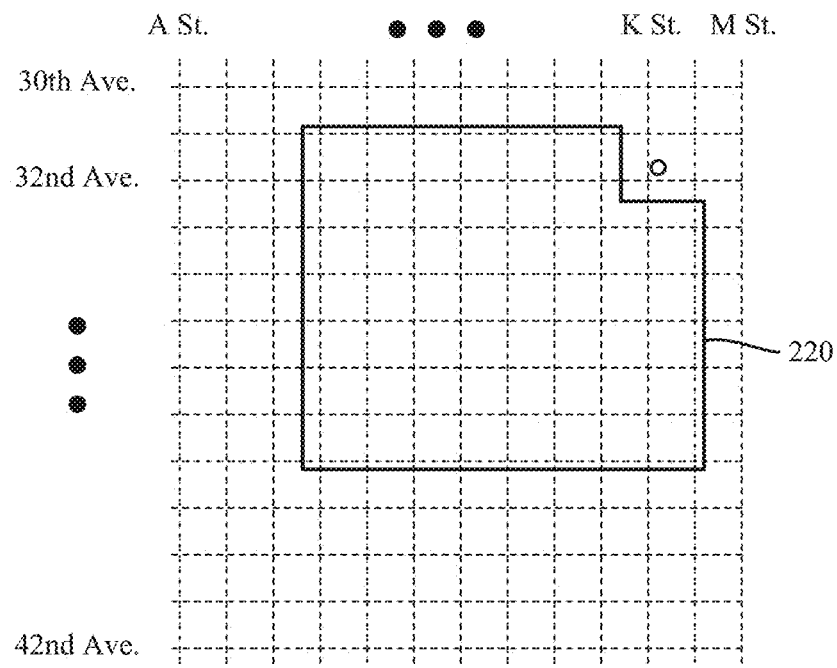
FIGS. 2A and 2B illustrate customization of traffic zones based on one or more criterion, in accordance with various aspects and implementations of the subject disclosure.

Turning to another aspect, a traffic zone area can be established by outputting boundary coordinates to a user equipment; (for a circle and ellipse, a center point and radius or major/minor axis data, respectively, can be provided). As shown in FIG. 2A, a traffic zone area 220 can be defined by providing bounding coordinates, or via inclusion and exclusion coordinates. In this way, for example, the traffic zone 220 can be established minus the upper right corner as shown proximate to the traffic zone area 220, or the upper right corner can be excluded from the traffic zone area 220.

Figure 2B:
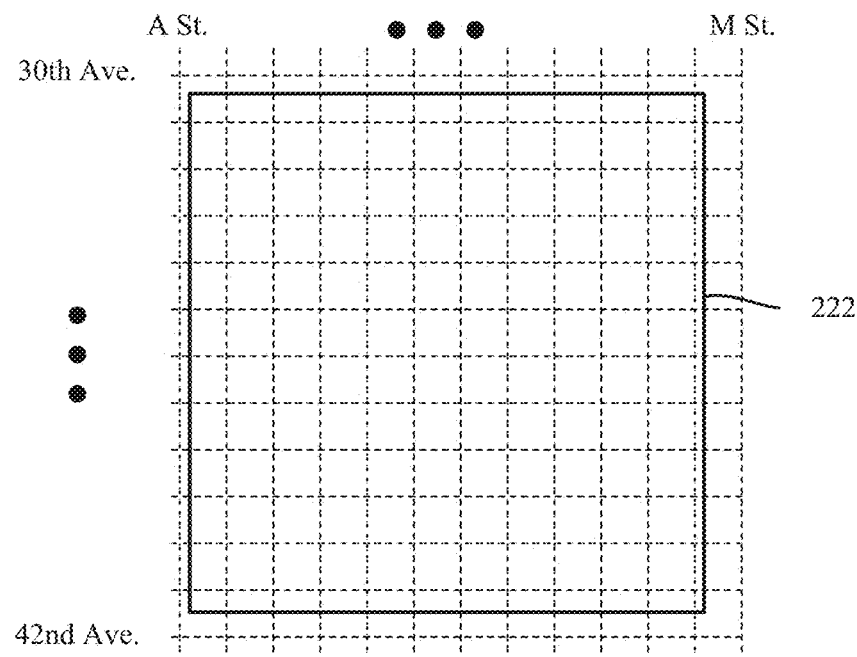

Moreover, a traffic zone can be changed at any time. Consider that the traffic zone 222 in FIG. 2B has been expanded relative to the traffic zone 220 of FIG. 2A, as well as not having its upper right corner carved out. Expansion or contraction of a traffic zone can be based on any criterion or combination thereof, e.g., traffic congestion, time of day, and so forth. Some time consideration may be provided to users, such as to not change a traffic zone area more than once every thirty minutes, do not change the traffic zone for a user who was not in the previously specified traffic zone provided the user leaves the new zone within five minutes, and so on.

Still further, a different user can get a different traffic zone from another user, which can be independent of other conditions. For example, consider that a user is known to be a resident of a city, such as residing near the circular dot by the intersection of K Street and 32nd avenue. Such a resident may have the traffic zone 220 of FIG. 2A created for the resident and her family members, whereas a non-resident has the traffic zone 222 created for him, including at the same time, under the same traffic conditions and so on. Thus, via user profile data, the system support discounts or exemptions for local residence, (as well as other user discounts, such as low income, handicapped, elderly, students, corporate discounts and so forth).

Figure 3:
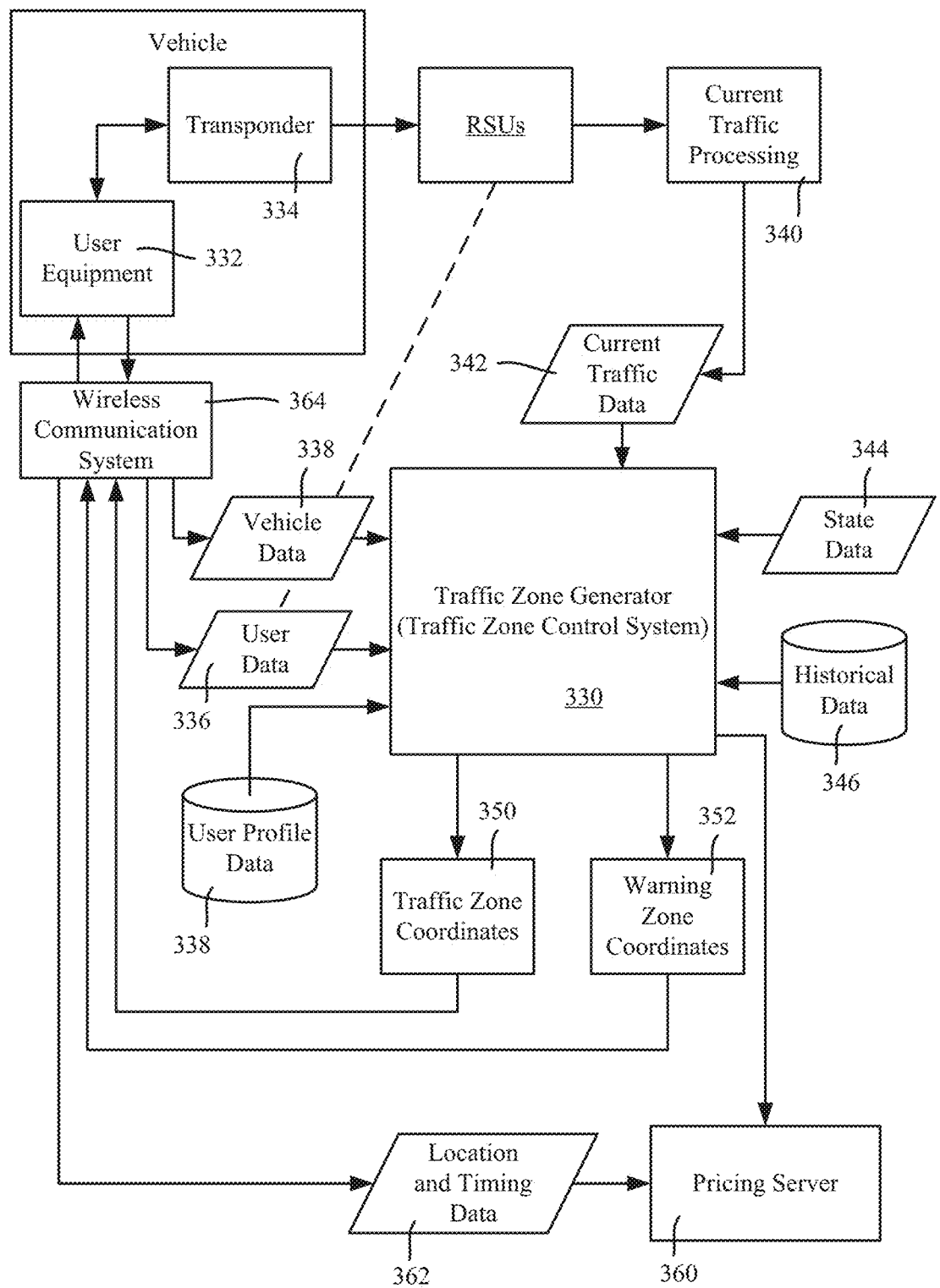
FIG. 3 is a block diagram representation of example components used to generate a customized traffic zone based on various possible example data, in accordance with various aspects and implementations of the subject disclosure FIGS. 4 and 5 comprise a block diagram representation of example components showing show how a traffic zone traffic management system can communicate with a city authority service delivery network and integrate with city endpoints with respect to a traffic zone, in accordance with various aspects and implementations of the subject disclosure.

Indeed, almost any number of criterion, combined or individually considered, can be used to create and/or modify a traffic zone. FIG. 3 shows some possible variables that can be considered by a traffic zone generator 330 component when generating a traffic zone, which can be per-user, per-group of users, per-vehicle and/or per group of vehicles.

For example, consider that a user equipment 332 couples with a transponder 334 and can thus report user data (e.g., identity) and vehicle type data to the traffic zone generator 330. It should be noted that in one or more alternative implementations, the transponder can (e.g., directly or indirectly) provide the user identity data and vehicle information to the traffic zone generator via one or more of the RSUs.

The user data 336 can be used to access user profile data that can factor into pricing, e.g., subscriber data (such as prepaid or not), discount data (e.g., for students, residents, seniors, low income users and so on), authorized city employee or not, registered carpool user, rideshare provider, and so on. The vehicle data can be used to modify the pricing, e.g., electric, hybrid, gas, diesel, axles, length, commercial versus passenger, bus, taxi and so on.

Data from the roadside units (RSUs) can be used by a current traffic processing component 340 to determine current traffic data 342, including average current speed and the number of vehicles, which indicate a current level of traffic congestion. Note that such information can also come from the user equipments that are active in the system.

State data 344 including dynamic information such as time of day, day of week, whether an event is taking place, where any construction is taking place and so forth may be used by the traffic zone generator 330. Static (or semi-static) state data such as road classification (e.g., highway, main thoroughfare, side street, boulevard, one-way street) and zoning can be used, as well as revenue models.

Historical data 346, which can include third party data such as obtained from rideshare services, can be used to predict congestion and the like, such as to configure a traffic zone so as to start charging in that traffic zone before actual congestion occurs, which will thereby reduce traffic. In addition to historical sensor data related to vehicle traffic, historical data 346 can include pedestrian data, bicycle data, number of parked cars, and so forth. Such historical data 346 can be per road, per intersection, per time of day, and so on. Historical data 346 also can be used to predict revenue, e.g., to determine a daily or hourly rate, as well as configure one or more traffic zones to predictably reduce expected traffic to a desired amount but not so much that too little revenue is collected.

With the above information, the traffic zone generator 330 can determine and output traffic zone coordinates 350 (or the like) and warning zone coordinates 352 (or the like) to the user equipment 332. Any of the information available to and output by the traffic zone generator 330 can also be provided to a pricing server 360 to determine the appropriate financial charge to apply to the user based on location and timing data 362 provided to the billing engine 360 by the wireless communications system 364.

Note that dwelling time within the traffic zone is one possible billing criterion, e.g., the longer a user and vehicle remain in the traffic zone, such as beyond a threshold time, the higher the amount billed. This, for example, can deter a rideshare vehicle from remaining in a congested traffic zone for an inordinate amount of time.

It should be noted that backup systems can be used for users/vehicles that do not have a user equipment or transponder, and to ensure that a user does not deactivate (e.g., turn off or shield) a user equipment or transponder. For example, cameras can be used to capture license plate images at select locations, with a higher price charged for such non-participating vehicles.

Thus, the technology described herein can define zone pricing based on real time and historical traffic data. A traffic zone control system collects, from sensors, the traffic average speed, traffic volume (number of vehicles/hour or other time unit), traffic density, lane occupancy (e.g., percentage), vehicle length (for vehicle classification), length of queue at an intersection, and when a vehicle is driving in the wrong direction (e.g., on a one-way street), and sends to the intelligent pricing server 460 for real time zone financial charges. Customizable pricing can be modified based on subscriber profile data.

The technology described herein leverages a wireless communications network to broadcast area cordoning boundary data to RSUs, smart connected controllers, and/or smart connected devices. Note that smart phone applications can communicate with RSUs via near field communications techniques, whereby dependency on network coverage is not needed in such a scenario.

Figure 4:
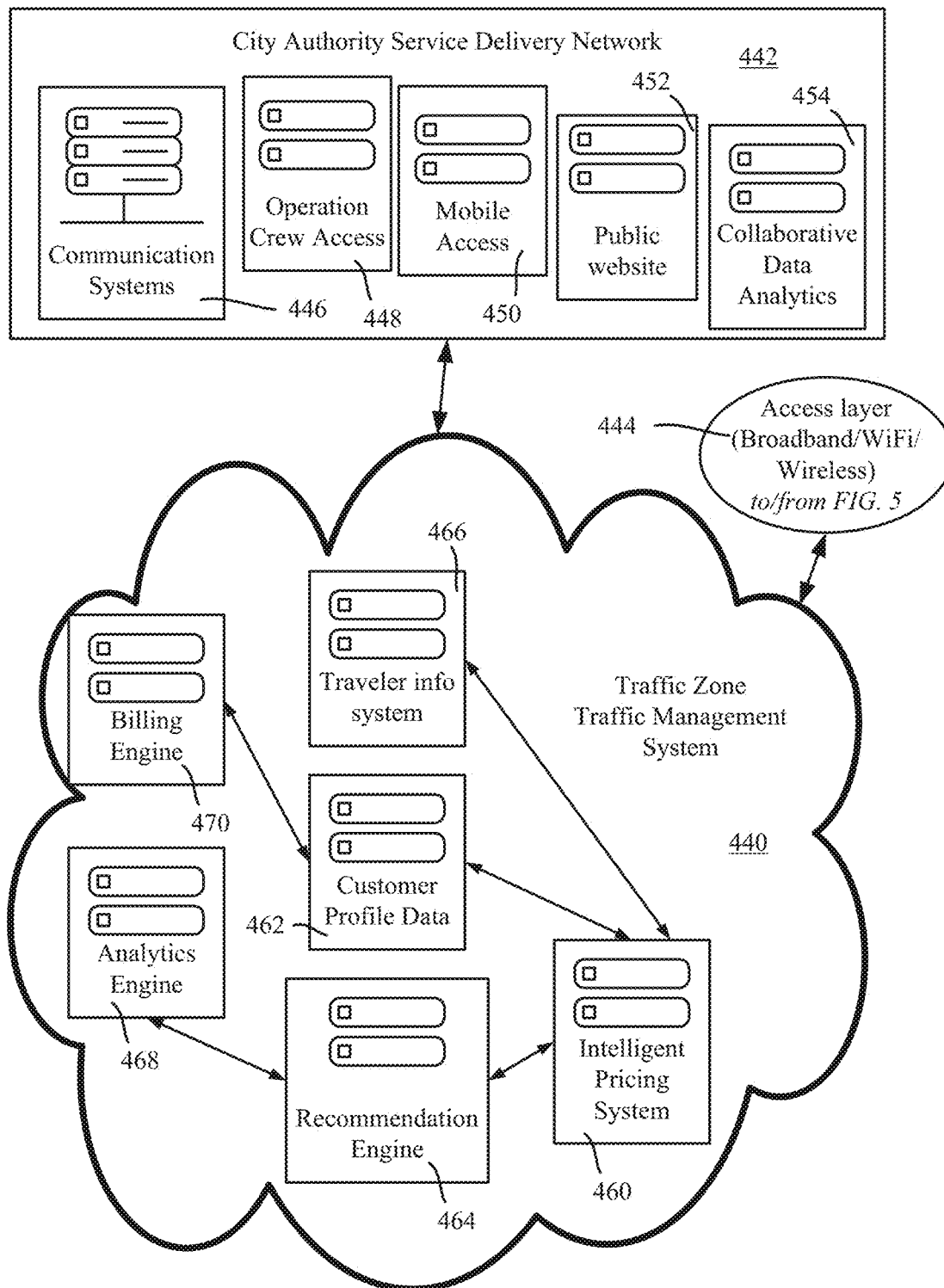
Figure 5:
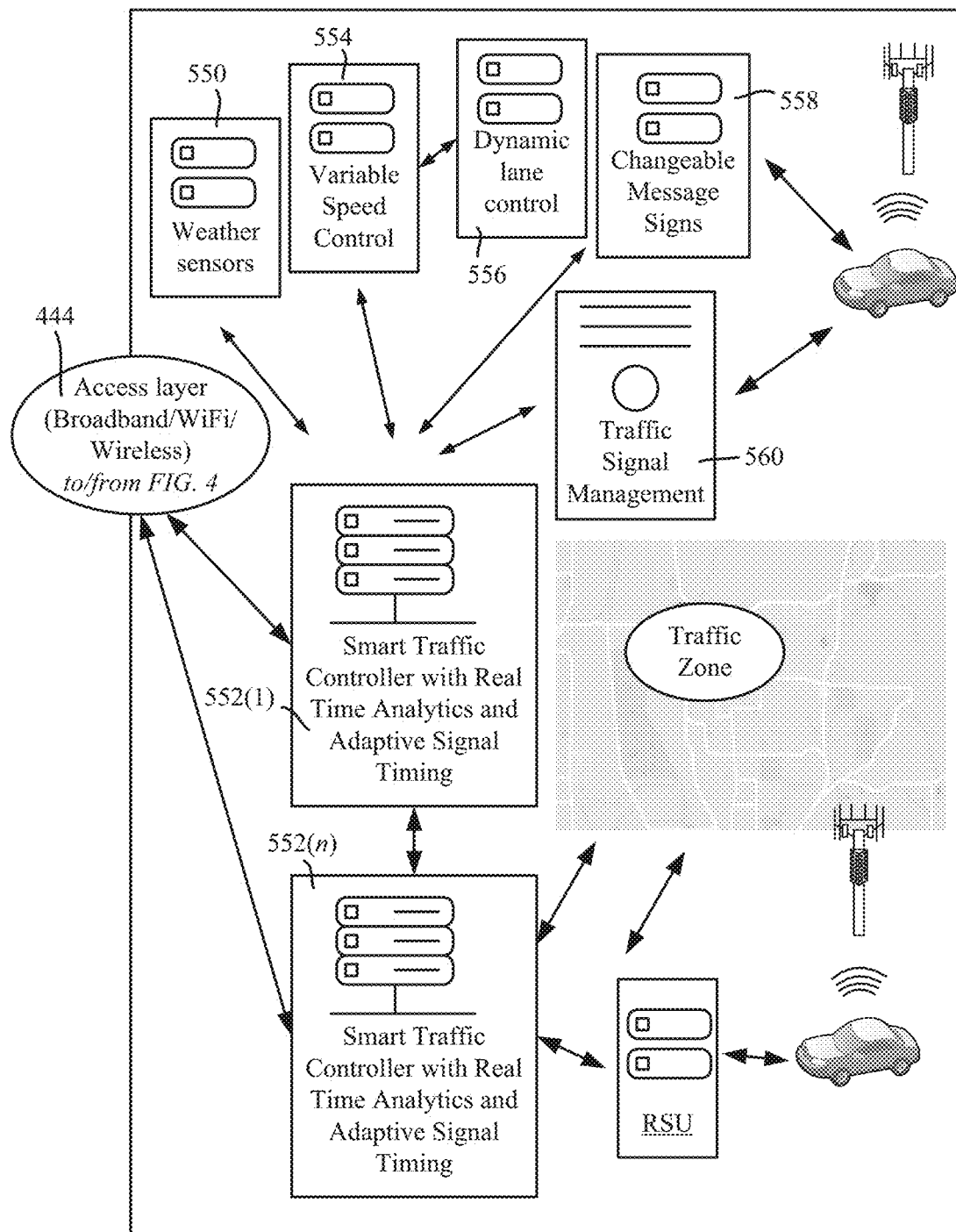

FIGS. 4 and 5 provide additional details of traffic zone traffic management system 440, and related components including a city authority service delivery network 442. The traffic zone traffic management system 440 couples to various city endpoints 550 (FIG. 5) via an access layer 444, which can be a broadband, Wi-Fi, wireless (e.g., 5G) link, or any combination thereof.

A typical example city authority service delivery network 442 includes communication systems 446, operation crew access 448, mobile access 450 such as for users' traffic-related mobile device application(s), a public website 450 (e.g., that provides traffic camera sites, user billing review and payments and so forth), and collaborative data analytics 454, which can analyze traffic patterns and the like based on traffic information obtained by the city directly and/or from third parties such as compiled by rideshare services.

In one or more implementations, the traffic zone traffic management system 440 "cloud" includes an intelligent pricing system 460 (such as the pricing server of FIG. 3) that can determine pricing based on the various variable information. Example non-limiting variable information can include the customizable zone, the user profile data 338, customer profile data stored in data servers 462, and so on. Other variable information can include user usage data for the day, e.g., to determine any further usage fee(s) based on whether a user previously was charged a zone usage or other (e.g., toll bridge) fee that day. A recommendation engine 464 can be used to recommend alternative routes and the like to users in the customizable traffic zone as well as those users about to enter the traffic zone. A traveler information system 466 can provide users with other travel-related information. An analytics engine 468 can be used to process and analyze collected data, such as for use by the recommendation engine 464.

A billing engine 470 can determine and apply bills to customers based on their customer profile data along with other factors described herein and the price determined by the intelligent pricing system for a configured traffic zone and a user's use thereof.

FIG. 5 shows how via the network access layer 444 the traffic zone traffic management system 440 can integrate with existing infrastructure including various city endpoints. Typical example city endpoints can comprise weather sensors 550 that provide weather information that can be processed by smart traffic controllers with real time analytics and adaptive signal timing. Smart traffic controllers 552(1)-552($n$) are depicted, and it can be readily appreciated that any practical number may be present. Note that in one or more implementations, such smart traffic controllers 552(1)-552($n$) comprise edge gateway devices (as opposed to operating in the cloud) in order to reduce latency and communication of large amounts of data and thereby provide faster real time operation, decision making, and so forth.

The smart traffic controllers 552(1)-552($n$), which obtain feedback from specified sensors, perform real time analytics that can be used to control various traffic-related devices, such as variable speed control devices 554, dynamic lane control devices 556, changeable message signs 558, and traffic signal management 560.

In addition to integrating with existing infrastructure, the smart traffic controllers 552(1)-552($n$) also integrate with customizable traffic zones as described herein, including to receive traffic zone-related information from and provide traffic zone-related information to one or more RSUs 562, to and from the wireless communication system in general (e.g., to send pricing and other messages to user equipments), and, for example, to change relevant changeable message signs 558 to indicate the current price of a customizable traffic zone (e.g., notwithstanding any discounts).

Figure 6:
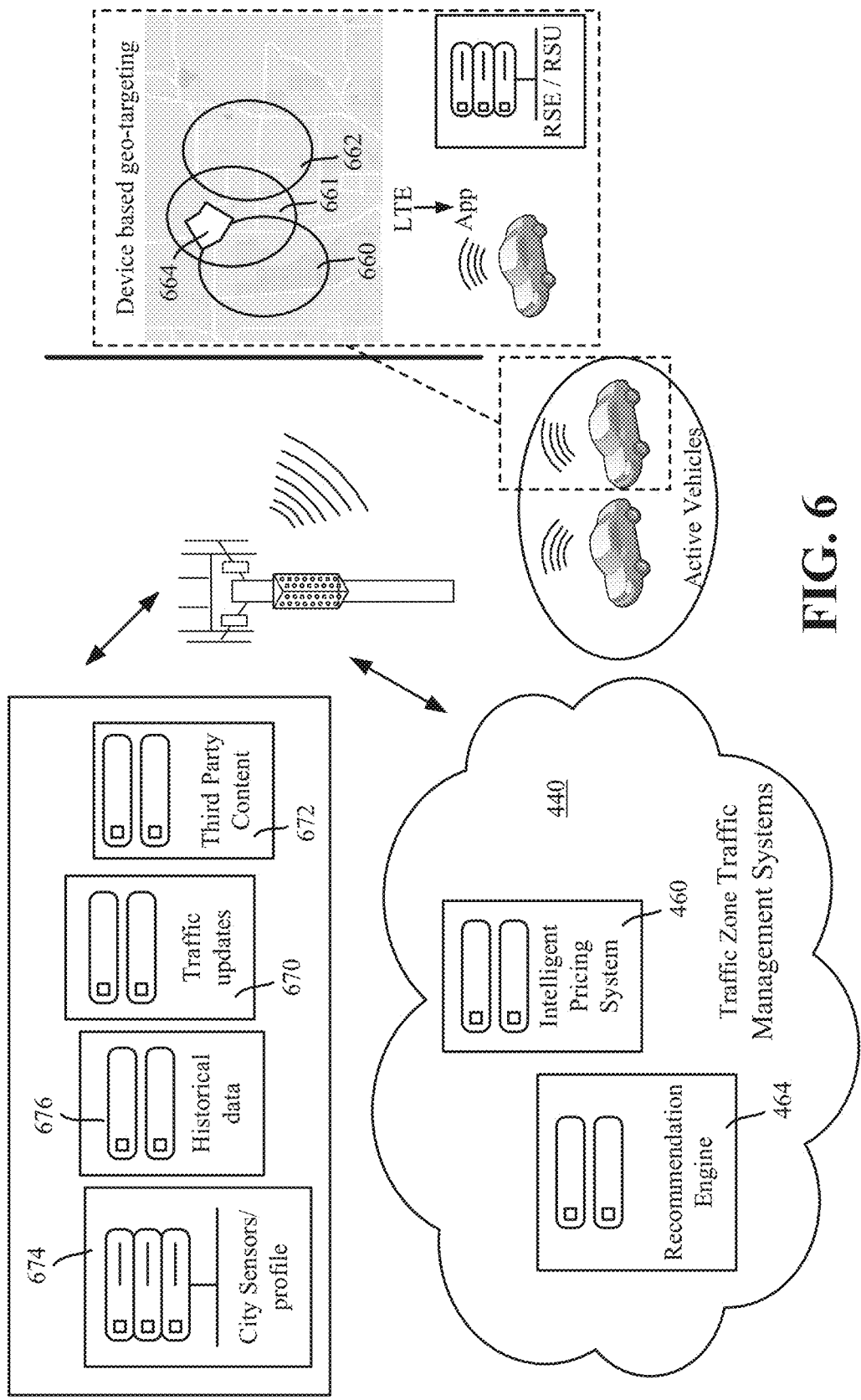
FIG. 6 is a block diagram representation of example components showing how a traffic zone can be customized and broadcast, including for use with mobile device geographic (geo-) targeting, in accordance with various aspects and implementations of the subject disclosure.

FIG. 6 shows another concept, namely device based geo-targeting within a traffic zone. In general, messages can be sent to any device within one or more traffic zones, represented by the ovals 660, 661 and 662 in FIG. 6. Note that traffic zones can overlap, not only for different users or over different times, but, for example, to have a priority ordering. For example, the traffic zone 661 can apply to traffic zone 660 users or traffic zone 662 in the areas that intersect with the traffic zone 661.

As described herein, the technology facilitates broadcasting polygon coordinates (or similar data for a circle or an ellipse) to user equipments in order to target those user equipments/vehicles. Consider that the white polygon 664 is specified via such coordinates. Users in the polygon's coordinates get a subsequent broadcast message, such as to target them for pricing changes, commercial purposes, and so forth. Those user equipments not within the polygon 664 ignore the message (or can display the message if the user equipment enters the polygon within a time limit), while those user equipments in the polygon 664 output the message to the user.

The intelligent pricing system 460 and recommendation engine 464 are shown as in FIG. 6 as being able to participate in the targeting, however it is understood that other systems/engines and so forth can also participate. Other devices can also participate in the targeting, such as for messaging traffic updates 670 and third party content 672 based on information obtained via city sensors 674 and historical data 676.

Thus, the traffic zone management and control system broadcasts a cordon boundary and traffic updates to RSUs, smart connected controllers, vehicles, and/or smartphone applications. The technology can target broadcast messages to a small area, e.g., an alert message can contain a text portion as well as the area information (e.g., polygon coordinates) of the affected area, which can be considered a geo-fence. The device decides whether the alert message is presented to the user, based on the device location with respect to the received polygon. As is understood, this facilitates the ability to geo-fence a specific area and distribute content using broadcasting. The device receiving the broadcast intelligently decides whether to present the alerts to the user.

Figure 7:
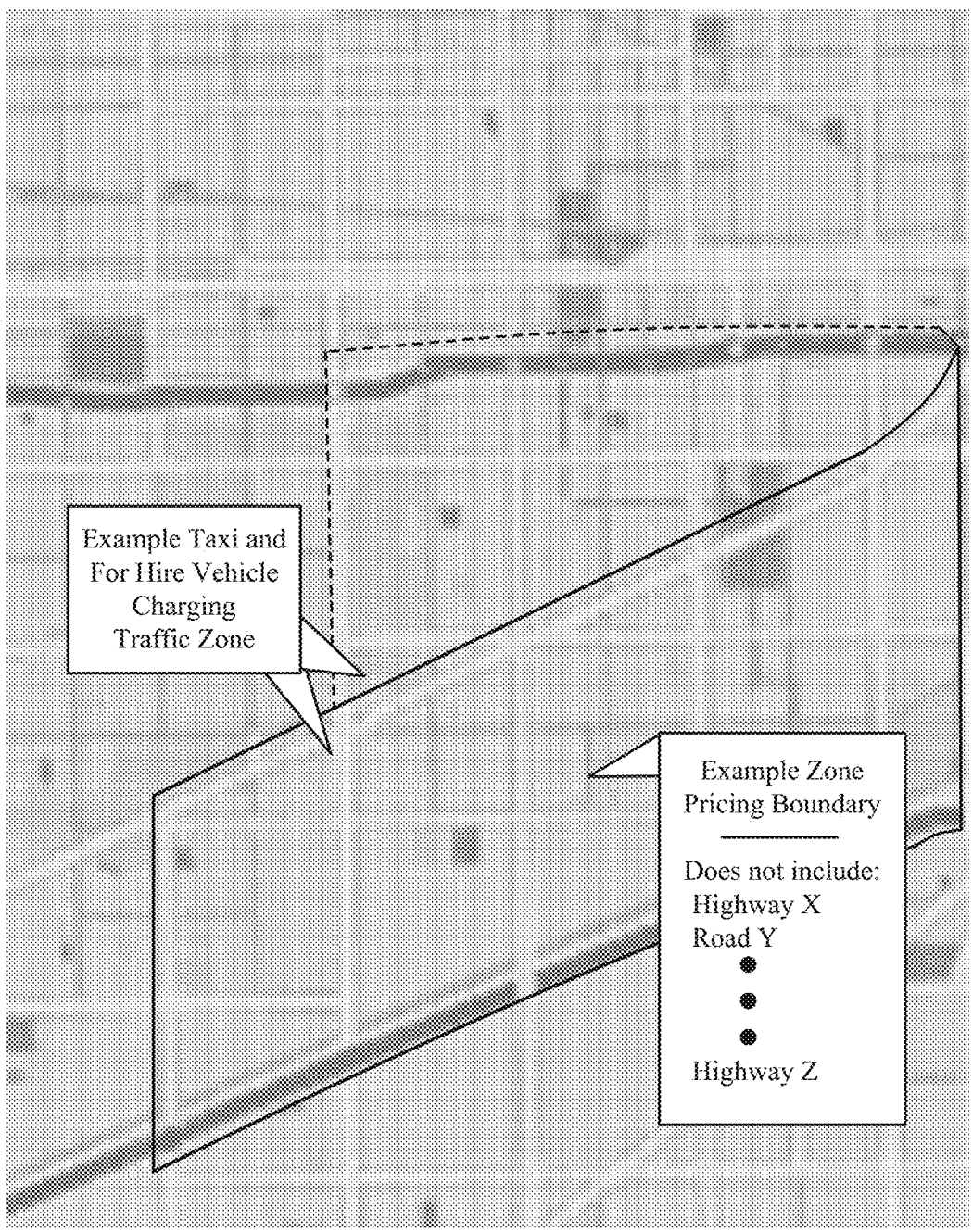
FIG. 7 is a representation of customizable traffic zones overlaid on a map, in accordance with various aspects and implementations of the subject disclosure.

FIG. 7 shows another customizable zone concept, namely an example customized taxi and for hire vehicle charging traffic zone 770, and a customized traffic zone 772 for other vehicles. In one alternative, the traffic zones 770 and 772 can be different, such that taxis and for hire vehicles in the traffic zone 770 pay a one rate, and pay a different rate when in the zone 772. In another alternative, the traffic zones can overlap, that is, taxis and for hire vehicles pay the same rate when in the traffic zone 770 or in the traffic zone 772, however other vehicles do not pay, for example, when in the traffic zone 770. FIG. 7 also shows that certain highways, roads (e.g., to bridges) and so forth can be excluded from the traffic zone 772, such as roads that already result in bridge or other tolls, or roads that are underutilized to encourage more usage.

Figure 8:
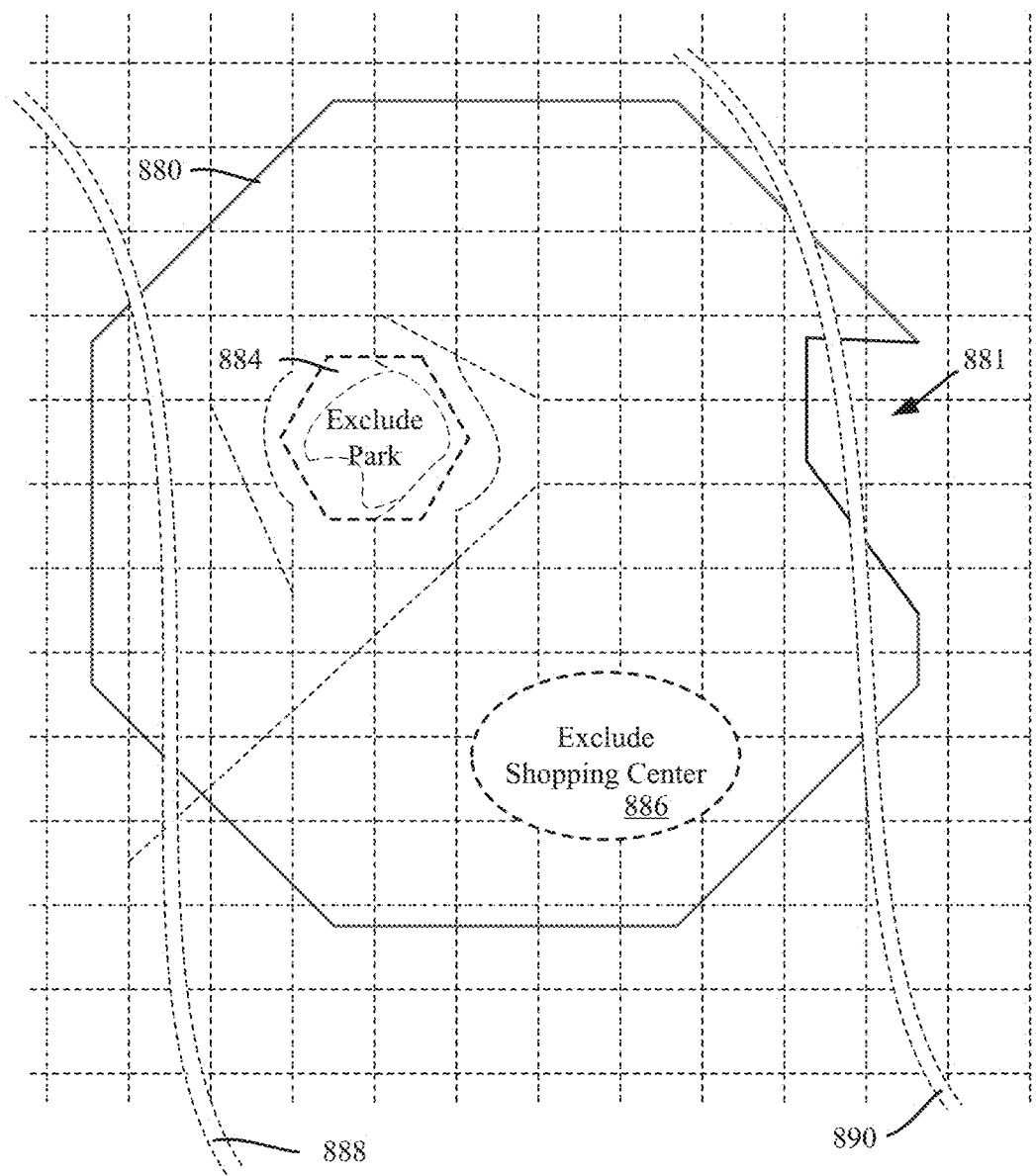
FIG. 8 is a representation of a customizable traffic zone with areas and roads therein distinguished from the traffic zone, in accordance with various aspects and implementations of the subject disclosure.

FIG. 8 shows additional concepts related to a customizable traffic zone 880. As can be seen, most of the traffic zone 880 is in the shape of an octagon, however a certain area (the approximate area labeled 881) is not part of the traffic zone 880.

Further, a park area 884 is excluded from the traffic zone 880. Note that it can be its own traffic zone, for example, that charges for entering but does not charge for dwell time. Another area 886 corresponding to a shopping center is excluded, such as to encourage commerce. This area 886, for example, can even reduce pricing of the traffic zone 880 provided some criterion is met; e.g., the regular zone traffic 880 price is reduced by X if the user equipment/vehicle dwells in the shopping center for a minimum time, is reduced by Y if the user equipment dwells in the shopping center for up to a maximum time, and so forth.

Still further, consider that the road labeled 888 is a toll road; such a road can be excluded from the zone pricing once the road toll is applied. As another example, note that the road labeled 890 enters, exits and reenters the traffic zone 880, regardless of vehicle direction. To avoid double-billing for the entry, exit and reentry, this road can be considered to not exit the traffic zone 880, but have a discount applied for the time that the vehicle is not within the zone. Thus, the technology can support exempt traffic pricing detection of vehicles that have passed through certain toll bridges, tunnels or roads, and flag their entry accordingly so that their toll charges can be deducted from traffic zone pricing.

Figure 9:
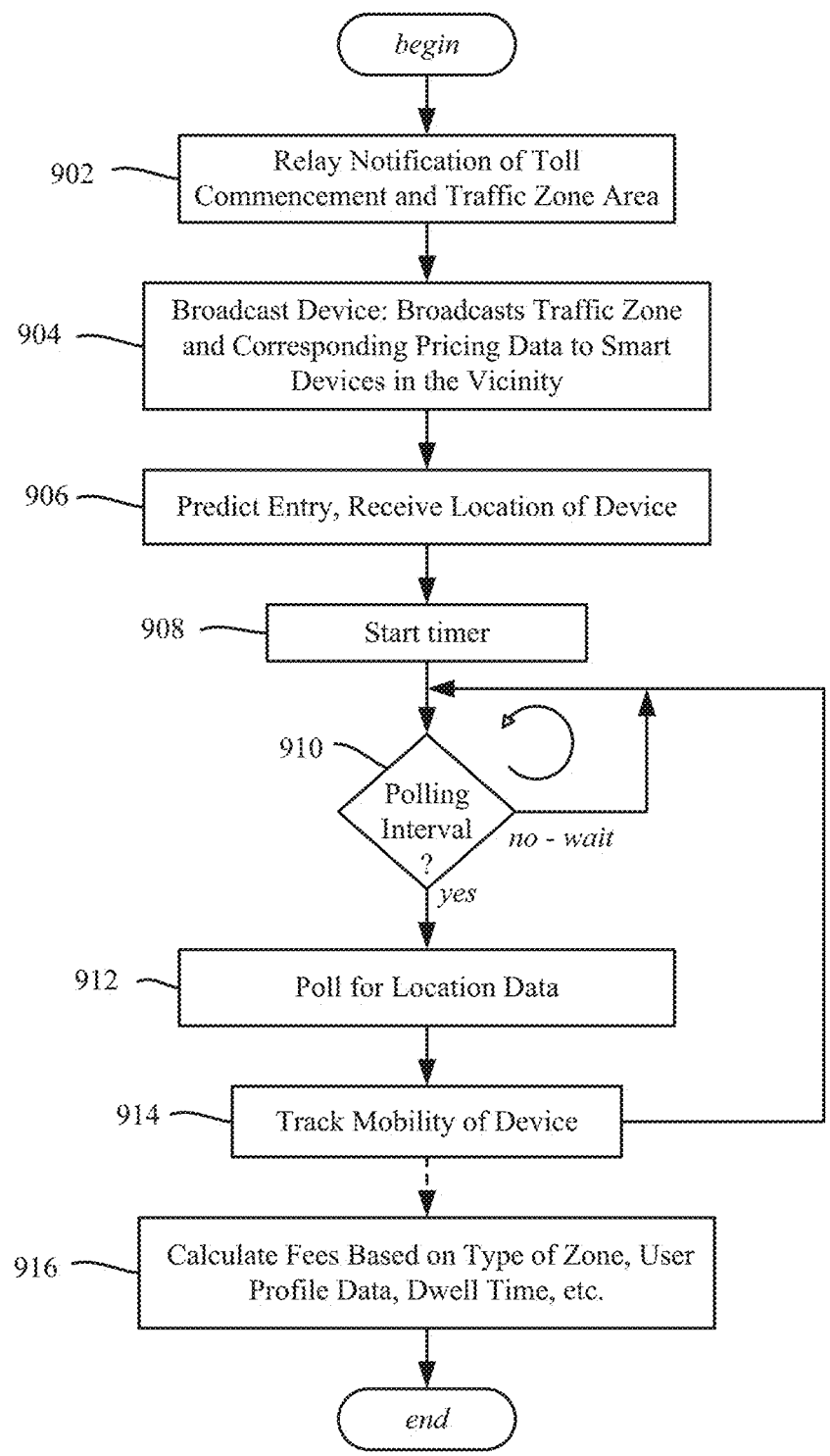
FIG. 9 illustrates a flow diagram of example operations of a traffic zone management system to provide a traffic zone and monitor devices therein, in accordance with various aspects and implementations of the subject disclosure.

As represented in the flow diagram of example operations of FIG. 9, in one or more implementations, at operation 902 a traffic zone management and control system relays the notification of toll commencement and traffic zone area (e.g., polygon coordinates) to a broadcast device (e.g., an intelligent server), such as based on historical sensor data, live sensor data/or and other factors as described herein. At operation 904, the broadcast device broadcasts the desired traffic zone and its corresponding pricing to the smart devices in the vicinity (e.g. RSU, a connected car telematic communication unit (TCU), smart devices, and so forth).

A smart device that receives the traffic zone information calculates its relative location and warns the user accordingly, e.g. ten minutes based on current speed or X feet before the vehicle and associated device enters the traffic zone or zones; (there can be multiple different zones with different pricing). If the device continues to approach the zone, based on smart device (e.g., user equipment) location and/or other profile information, then the traffic zone management and control system predicts the intent of the user to proceed at operation 906.

As also represented by operation 906, once the user device enters the traffic (toll) zone, the cloud-based charging system receives the new location of the user device, such as based on static road objects (e.g. RSU, a Bluetooth® beacon implemented on the road, a LPR (license plate reader) or RFID toll tag); associated metadata can include time of day, latitude/longitude, device type (electrical car, vehicle number of axles) and so forth. A timer starts at operation 908 once the device enters the toll zone.

As represented by operations 910 and 912, the traffic zone management system polls (via the wireless network user plane) the user equipment device at configurable time intervals to determine the current location information. A model in which the user device pushes the location information is also feasible. In addition, at operation 914 the traffic zone management system tracks the mobility of the device (via user equipment GPS or other timing-based location value, along with the last known location value, plus data from any static road objects that identified (or were in range of) the vehicle.

At any time, which can be while waiting for the polling interval, after mobility tracking or per some other interval or event (such as exiting the zone), the traffic zone management system can run computations (operation 916) to calculate the toll fees based on the type of zone, the user profile (e.g., resident or nonresident) and the duration of the time the user equipment device stays or has stayed in the traffic zone. The system can run a usage algorithm that can add a surcharge for environmental (e.g. emission) fees.

The traffic zone management system is thus able to offer the various pricing via one or more algorithms defined in the intelligent pricing system 460 (FIG. 4) because the traffic zone management system correlates the information collected via the sensors, the metadata of the connected vehicles and/or the subscribers, and the profile of the subscribers.

Figure 10:
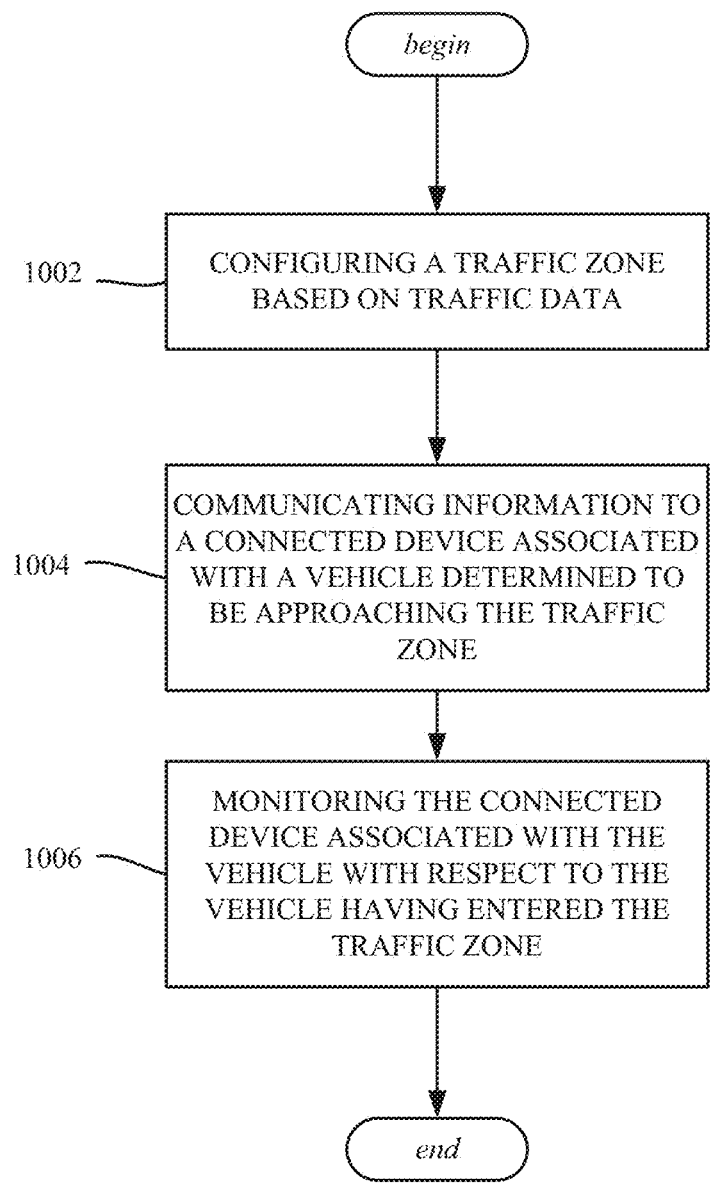
FIG. 10 illustrates a flow diagram of example operations related to configuring a traffic zone and monitoring a connected device in the traffic zone, in accordance with various aspects and implementations of the subject disclosure.

One or more aspects are generally represented in FIG. 10, and can correspond to system comprising a processor and a memory that stores executable instructions that, when executed by the processor, facilitate performance of operations. Example operation 1002 represents configuring a traffic zone based on traffic data. Example operation 1004 represents communicating information to a connected device associated with a vehicle determined to be approaching the traffic zone. Example operation 1006 represents monitoring the connected device associated with the vehicle with respect to the vehicle having entered the traffic zone.

Configuring the traffic zone based on the traffic data can comprise processing data obtained from a road sensor monitoring a road associated with the traffic zone. Configuring the traffic zone based on the traffic data comprises analyzing historical data and state data associated with the traffic zone.

Communicating the information to the connected device associated with the vehicle determined to be approaching the traffic zone can comprise communicating warning information related to a financial charge to be applied upon the vehicle entering the traffic zone. Communicating the information to the connected device associated with the vehicle determined to be approaching the traffic zone can comprise broadcasting the information to the vehicle based on a defined area external to the traffic zone.

Monitoring the connected device associated with the vehicle with respect to the vehicle having entered the traffic zone can comprise applying a financial charge based on a time duration during which the connected device associated with the vehicle remains in the traffic zone after having entered. The financial charge can correspond to a first pricing rate, and further operations can comprise obtaining updated traffic information, and varying the financial charge to a second pricing rate based on the updated traffic information.

Monitoring the connected device associated with the vehicle with respect to the vehicle having entered the traffic zone can comprise applying a financial charge based on user profile data. The traffic zone can be a first traffic zone configured based on first user profile data, and further operations can comprise configuring a second traffic zone based on second user profile data.

Monitoring the connected device associated with the vehicle with respect to the vehicle having entered the traffic zone can comprise applying a financial charge based on vehicle type information representative of a vehicle type of the vehicle. Monitoring the connected device associated with the vehicle with respect to the vehicle having entered the traffic zone can comprise applying a financial charge based on traffic zone type information representative of a traffic zone type of the traffic zone.

Further operations can comprise obtaining updated traffic data as an update to the traffic data, and reconfiguring the traffic zone based on the updated traffic data.

Figure 11:
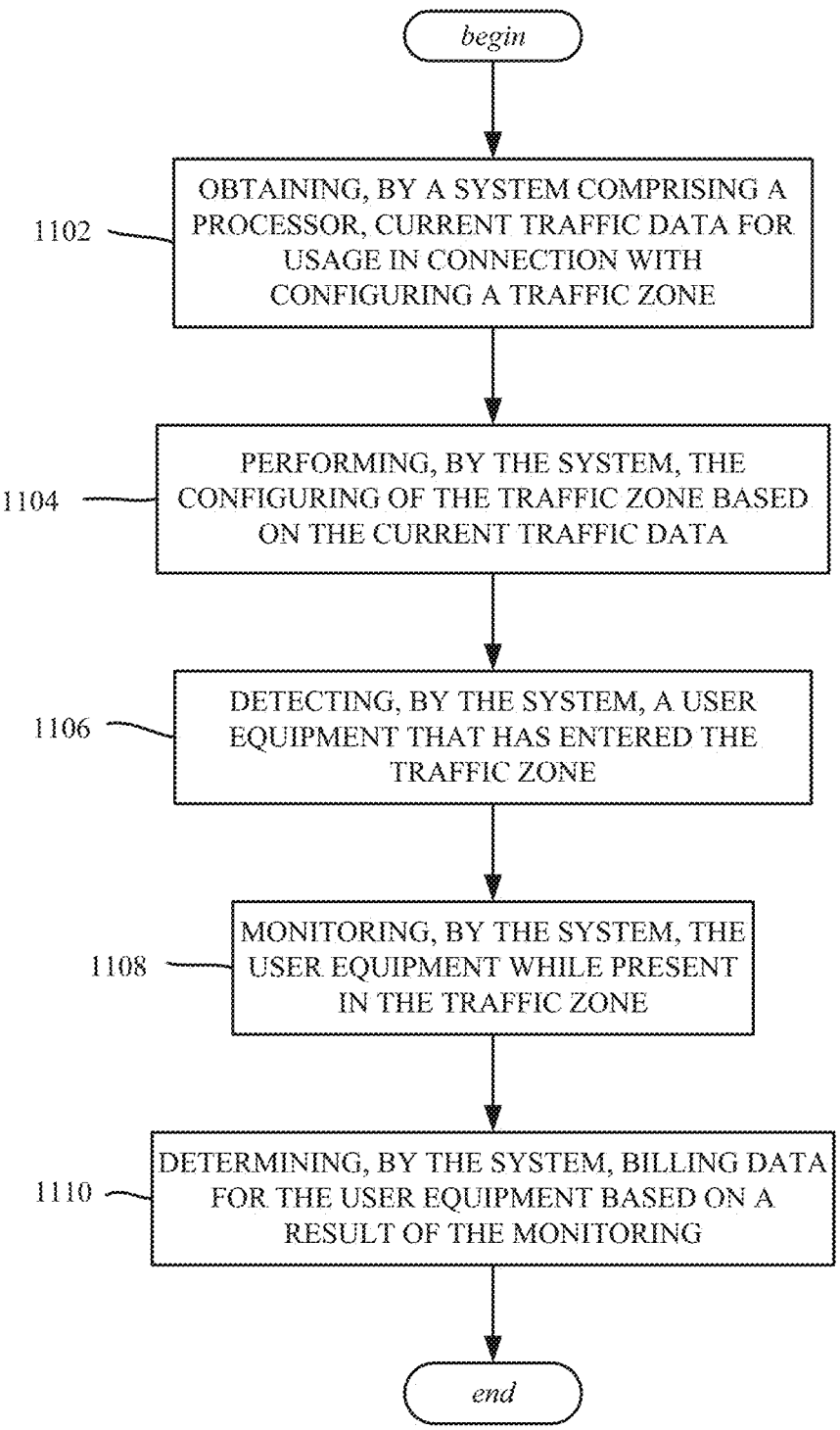
FIG. 11 illustrates a flow diagram of example operations related to using traffic data to configure a traffic zone, and monitoring a user equipment in the traffic zone, including for billing, in accordance with various aspects and implementations of the subject disclosure.

One or more aspects are generally represented in FIG. 11, and can correspond to a method, e.g., of operations. Operation 1102 represents obtaining, by a system comprising a processor, current traffic data for usage in connection with configuring a traffic zone. Operation 1104 represents performing, by the system, the configuring of the traffic zone based on the current traffic data. Operation 1106 represents detecting, by the system, a user equipment that has entered the traffic zone. Operation 1108 represents monitoring, by the system, the user equipment while present in the traffic zone. Operation 1110 represents determining, by the system, billing data for the user equipment based on a result of the monitoring.

Aspects can comprise obtaining, by the system, updated traffic data to replace the current traffic data, and reconfiguring, by the system, the traffic zone based on the updated traffic data.

Determining the billing data further can comprise factoring in at least one of: vehicle type information representative of a type of a vehicle associated with user equipment, user profile data representative of a user profile associated with user equipment, historical data associated with the traffic zone or state data associated with the traffic zone.

Determining the billing data based on the result of the monitoring can comprise evaluating an amount of time the user equipment has stayed in the traffic zone.

Figure 12:
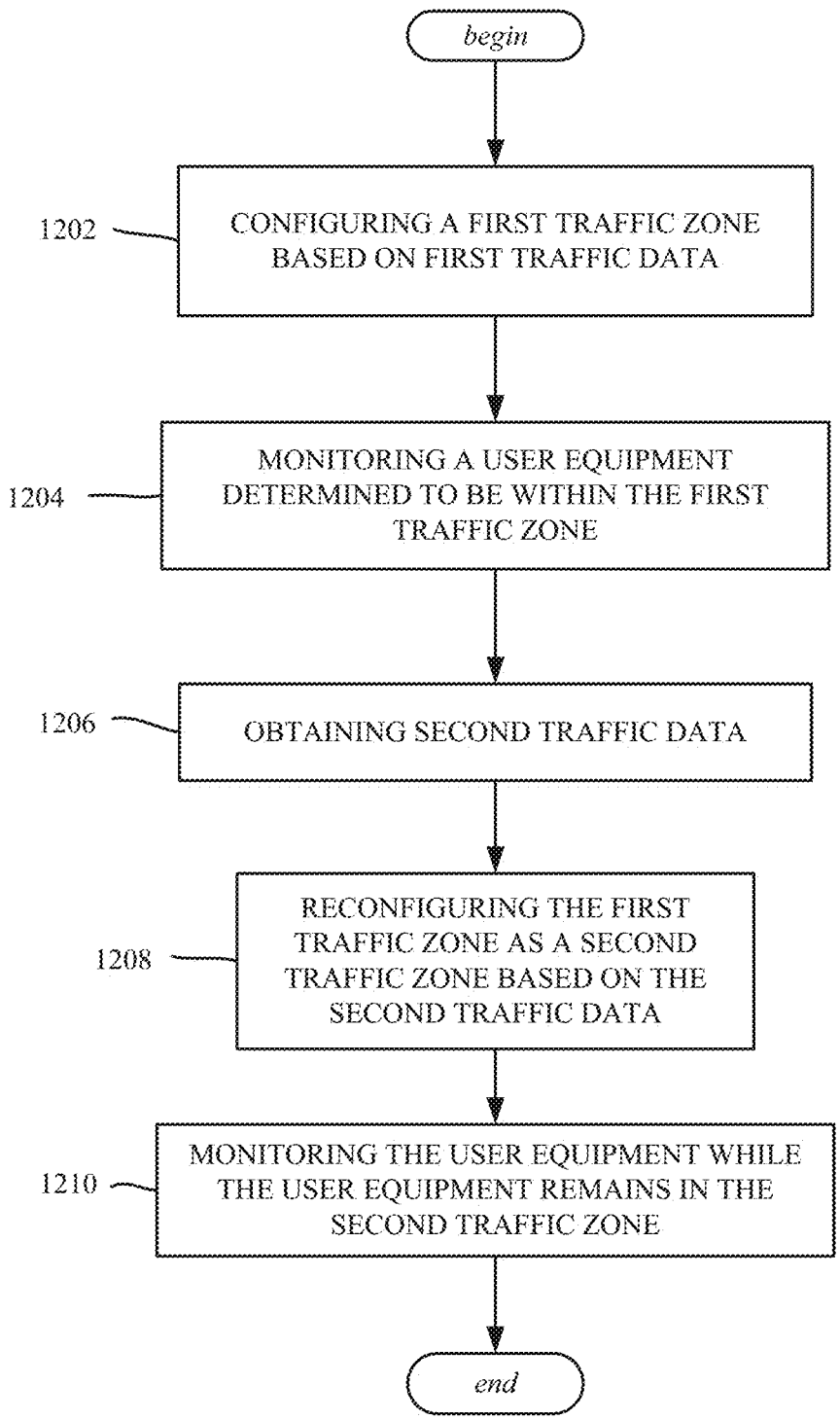
FIG. 12 illustrates a flow diagram of example operations related to using first traffic data to configure a traffic zone and monitoring a user equipment in the traffic zone, and reconfiguring the traffic zone based on second (e.g., updated) traffic data, in accordance with various aspects and implementations of the subject disclosure.

One or more aspects are represented in FIG. 12, and can correspond to operations, e.g., of a machine-readable storage medium, comprising executable instructions that, when executed by a processor facilitate performance of the operations. Operation 1102 represents configuring a first traffic zone based on first traffic data. Operation 1104 represents monitoring a user equipment determined to be within the first traffic zone. Operation 1106 represents obtaining second traffic data. Operation 1108 represents reconfiguring the first traffic zone as a second traffic zone based on the second traffic data. Operation 1110 represents monitoring the user equipment while the user equipment remains in the second traffic zone.

Further operations can comprise determining billing data for the user equipment based on a first result of the monitoring the user equipment within the first traffic zone and a second result of the monitoring the user equipment within the second traffic zone.

Reconfiguring the first traffic zone as the second traffic zone can comprise expanding an area corresponding to the first traffic zone to a larger area than the area corresponding to the second traffic zone.

Reconfiguring the first traffic zone as the second traffic zone can comprise contracting an area corresponding to the first traffic zone to a smaller area than the area corresponding to the second traffic zone.

As can be seen, because the wireless network in conjunction with the road sensors can determine (relatively closely) the path of a vehicle by polling for its location during regular intervals, virtually any customizable traffic zone can be created, along with any exceptions, discounts, price reductions and the like. The traffic zone or zones can be varied at any time.

It should be noted that a traffic zone can be created for a private enterprise, such as an amusement park, parking lot and so forth. For example, consider that a "preferred user" entrance gives better parking access, or parking is reduced for subscribing members versus non-subscribers, handicapped and senior discounts, and so on.

Still further, traffic with respect to a traffic zone can be foot traffic, bicycle traffic and other modes of transportation such as electric scooters. Zones can be defined for such traffic, and indeed, people can be encouraged to move away from crowded areas to less crowded areas via pricing or rewards such as coupons, shorter wait times, and the like.

The technology described herein thus addresses the supply and demand of a traffic zone, and can create, in substantially real time, a customizable and configurable pricing scheme. The traffic zone can be based on variables such as current traffic information (e.g., number of cars in the zone, number of parked cars, number of pedestrians in a cross road, vehicle types, and so forth) and actual device metadata and status including current location, profile of the device and/or user (e.g., connected car, small phone), traffic speed, traffic directions, transactions log, trend analytics and so forth.

Aspects of the technology operate by collaborating various input obtained from roadside traffic sensors and other factors such as a road user's current condition, status and user-defined preferences. In this way, a traffic zone (e.g., a mobile commerce zone or a congestion pricing zone) can be created. The zone creation can be based on the input obtained from combining the historical data and real time input data from different sensors such as road sensors that can detect number of cars in the congestion zone, types of cars (e.g. commercial versus private vehicles versus public service vehicles), along with state data such as time of the day/week, road classification/zoning, desired revenue and the like. The technology creates the traffic zone for desired geo-locations/street zones and so forth.

The zoning information and pricing can be modified based on the number of vehicles (or the number of subscribers) in the vicinity and the drivers/subscribers who desire to continue the path of driving towards the traffic zone or navigate to the locations that intersect with the traffic zone. The technology can use broadcast technology to distribute various information including pricing and other messages to smart roadside units and intelligent connected devices including user equipments.

The technology provides the ability to create a traffic zone dynamically and/or statically. Because a software-based approach is used, a more flexible customizable system is provided in contrast to building fixed and expensive infrastructure like gantries for toll roads and bridges. The technology facilitates high flexibility by incorporating user based preferences and profiles. The technology can provides significant key performance indicators in live systems rather than via backend correlating of data from multiple data sources. Such data can be used to collect additional revenues from other commercial entities.

Advantages include avoiding the need for expensive infrastructure for gantries. Integrated technologies in the transponders can be incorporated (e.g., RFID with eSIMs).

The technology supports configurable fee pricing, which can be based on per entry/exit, per zone and by wait times and/or dwell times. The technology supports variable pricing. The technology supports dynamic pricing, in which rates can be continually or regularly adjusted according to traffic conditions to maintain a free flowing level of traffic. Rates can be determined in real time throughout the day. A pricing system can establish different rates for various times of the day or week that are based on a predetermined set of conditions, such as traffic speed, congestion levels, traffic demand, or other measurable parameters. Discounts for carpool trips are also supported.

The technology supports configurable For Hire Vehicles (FHV) pricing from per entry/exit, per zone and by wait times. This can discourage the cruise time/wait time in the traffic zone without passengers by correlating the vehicle profile with the location and time in the zone.

As can be further appreciated, a city, county or even private enterprise can benefit from the above technology, including by measure investment thereof. For example, a city can measure driver behavior (willingness to pay, travel time and vehicle speed improvements), traffic volumes (measure the average vehicle trips before and after the implementation and any change, travel speeds (provide analysis of vehicle speed improvements), transit ridership (compare the transit ridership before and after implementation and any change thereto), and air quality (greenhouse gas reduction).

Enforcement of traffic laws is also facilitated via real time visibility of the traffic zone and vehicles therein. In addition, the system can use the analytics collected to improve public safety/road maintenance planning and adjustments.

A city can resell collected/analyzed information to third parties such as rideshare service providers to predict changes in of ridership for carpool preference. The technology can assist Telecom providers to predict cell phone usages or types of usage (e.g. video streaming), e.g., based on the number of vehicles entering the traffic zone.

There is a straightforward correlation of traffic-to-vehicle types, e.g., passenger vehicles versus bus. The technology facilitates planning, such as for freight and cargo delivery companies for delivery of goods, along with improving fleet and supply chain management.

Figure 13:
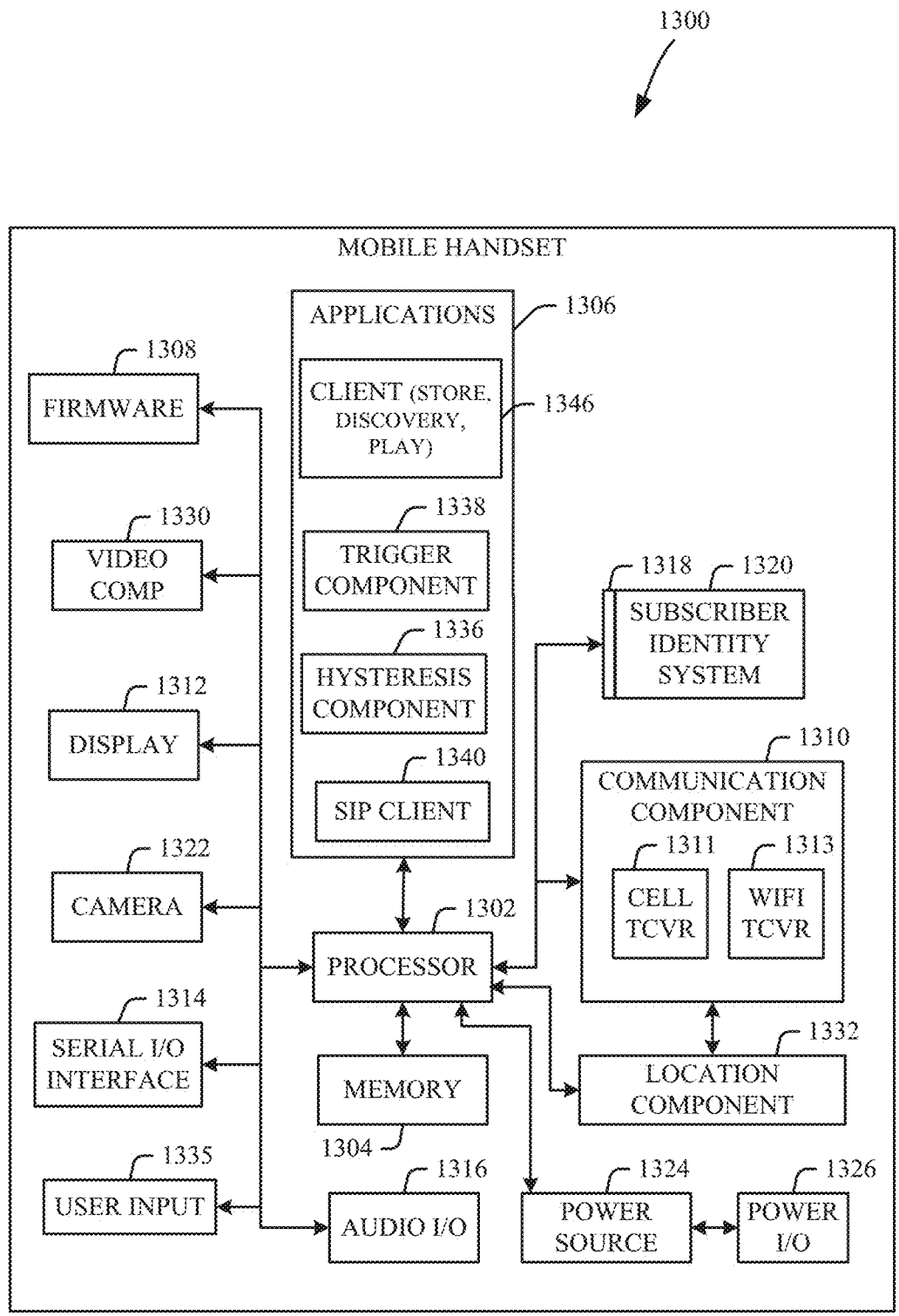
FIG. 13 illustrates an example block diagram of an example mobile handset operable to engage in a system architecture that facilitates wireless communications according to one or more embodiments described herein.

Referring now to FIG. 13, illustrated is a schematic block diagram of an example end-user device such as a user equipment) that can be a mobile device 1300 capable of connecting to a network in accordance with some embodiments described herein. Although a mobile handset 1300 is illustrated herein, it will be understood that other devices can be a mobile device, and that the mobile handset 1300 is merely illustrated to provide context for the embodiments of the various embodiments described herein. The following discussion is intended to provide a brief, general description of an example of a suitable environment 1300 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1300 includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications.

The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communication component 1310 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1322 (e.g., a camera) can be provided for decoding encoded multimedia content. The video processing component 1322 can aid in facilitating the generation, editing and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1338 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 810, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
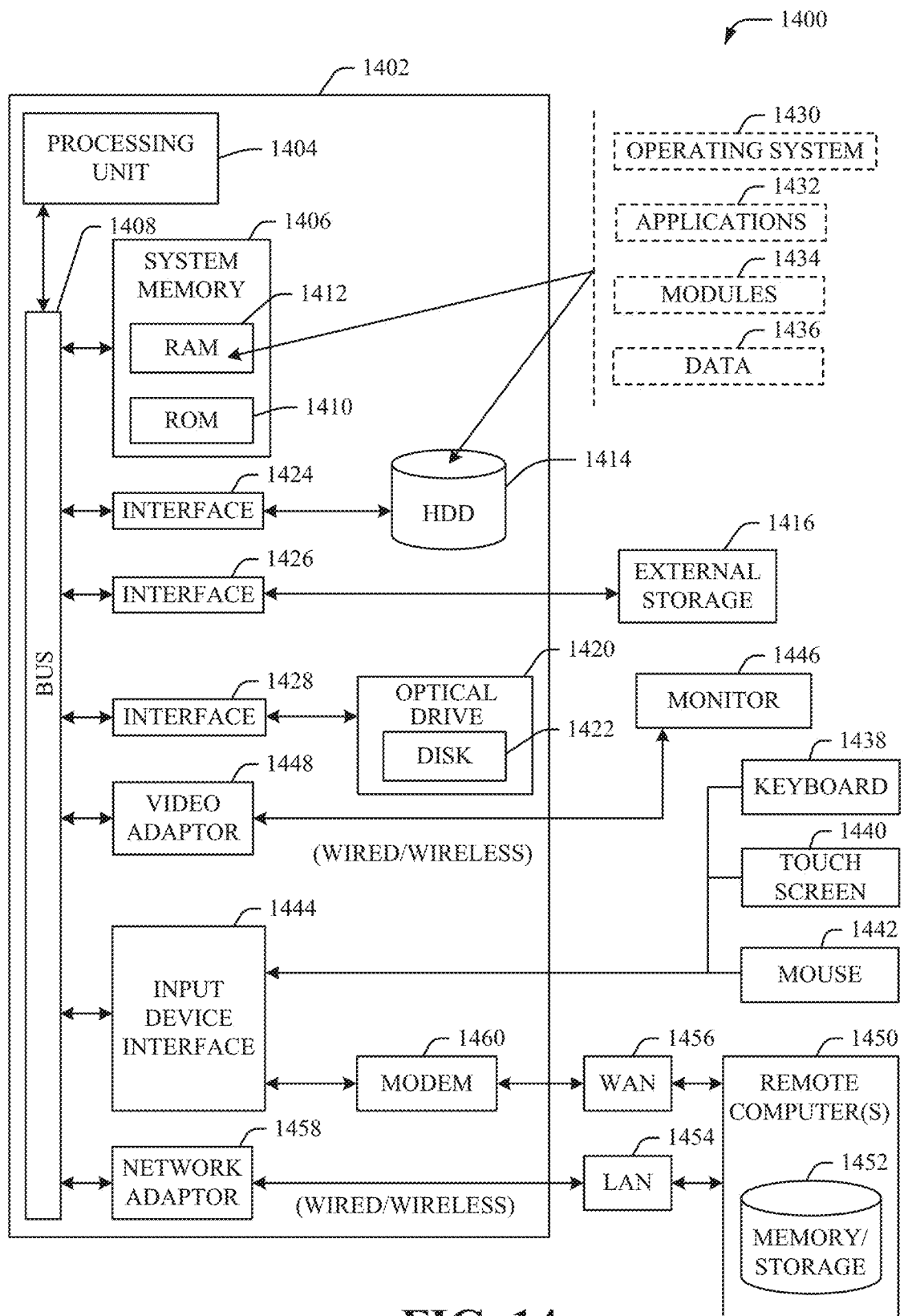
FIG. 14 illustrates an example block diagram of an example computer operable to engage in a system architecture that facilitates wireless communications according to one or more embodiments described herein.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the technology described herein can be practiced with other computer system configurations, including single-processor or multiprocessor computer systems, minicomputers, mainframe computers, Internet of Things (IoT) devices, distributed computing systems, as well as personal computers, handheld computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 14 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor, facilitate performance of operations, the operations comprising:
   configuring:
      a first chargeable traffic zone based on traffic data and first user profile data associated with a first user identity, and
      a second chargeable traffic zone based on the traffic data and second user profile data associated with a second user identity, wherein the second chargeable traffic zone comprises a first portion of the first chargeable traffic zone, and excludes a second portion of the first chargeable traffic zone;
   communicating information to a connected device associated with a vehicle associated with the first user profile determined to be approaching the first chargeable traffic zone; and
   monitoring the connected device associated with the vehicle with respect to the vehicle having entered the first chargeable traffic zone.

2. The system of claim 1, wherein the configuring of the first chargeable traffic zone comprises processing data obtained from a road sensor monitoring a road associated with the first chargeable traffic zone.

3. The system of claim 1, wherein the configuring of the first chargeable traffic zone comprises analyzing historical data and state data associated with the first chargeable traffic zone.

4. The system of claim 1, wherein the communicating of the information to the connected device associated with the vehicle determined to be approaching the first chargeable traffic zone comprises communicating warning information related to a financial charge to be applied upon the vehicle entering the first chargeable traffic zone.

5. The system of claim 1, wherein the communicating of the information to the connected device associated with the vehicle determined to be approaching the first chargeable traffic zone comprises broadcasting the information to the vehicle based on a defined area external to the first chargeable traffic zone.

6. The system of claim 1, wherein the monitoring of the connected device associated with the vehicle with respect to the vehicle having entered the first chargeable traffic zone comprises applying a financial charge based on a time duration during which the connected device associated with the vehicle remains in the first chargeable traffic zone after having entered.

7. The system of claim 6, wherein the financial charge corresponds to a first pricing rate, and wherein the operations further comprise, obtaining updated traffic data, and varying the financial charge to a second pricing rate based on the updated traffic data.

8. The system of claim 1, wherein the monitoring of the connected device associated with the vehicle with respect to the vehicle having entered the first chargeable traffic zone comprises applying a financial charge based on the first user profile data.

9. The system of claim 1, wherein the monitoring of the connected device associated with the vehicle with respect to the vehicle having entered the first chargeable traffic zone comprises applying a financial charge based on vehicle type information representative of a vehicle type of the vehicle.

10. The system of claim 1, wherein the monitoring of the connected device associated with the vehicle with respect to the vehicle having entered the first chargeable traffic zone comprises applying a financial charge based on traffic zone type information representative of a traffic zone type of the first chargeable traffic zone.

11. The system of claim 1, wherein the operations further comprise, obtaining updated traffic data as an update to the traffic data, and reconfiguring the first chargeable traffic zone based on the updated traffic data.

12. A method, comprising:
   obtaining, by a system comprising a processor, current traffic data;
   configuring, by the system:
      a first congestion pricing traffic zone based on the current traffic data and first user profile data associated with a first user identity, and
      a second congestion pricing traffic zone based on the current traffic data and second user profile data associated with a second user identity, wherein the second congestion pricing traffic zone comprises a first portion of the first congestion pricing traffic zone, and excludes a second portion of the first congestion pricing traffic zone;
   detecting, by the system, a user equipment that has entered the first congestion pricing traffic zone;
   monitoring, by the system, the user equipment while present in the first congestion pricing traffic zone; and
   determining, by the system, billing data for the user equipment based on a result of the monitoring.

13. The method of claim 12, further comprising obtaining, by the system, updated traffic data to replace the current traffic data, and reconfiguring, by the system, the first congestion pricing traffic zone based on the updated traffic data.

14. The method of claim 12, wherein the determining of the billing data further comprises factoring in at least one of:

vehicle type information representative of a type of a vehicle associated with user equipment, user profile data representative of a user profile associated with user equipment, historical data associated with the first congestion pricing traffic zone or state data associated with the first congestion pricing traffic zone.

15. The method of claim 12, wherein the determining of the billing data based on the result of the monitoring comprises evaluating an amount of time the user equipment has stayed in the first congestion pricing traffic zone.

16. A non-transitory machine-readable medium, comprising executable instructions that, when executed by a processor facilitate performance of operations, the operations comprising:
configuring:
a first fee-based traffic zone based on first traffic data and first user profile data associated with a first user identity, and
a second fee-based traffic zone based on traffic data and second user profile data associated with the second user identity, wherein the second fee-based traffic zone comprises a first portion of the first fee-based traffic zone, and excludes a second portion of the first fee-based traffic zone;
monitoring a user equipment associated with the first user profile determined to be within the first fee-based traffic zone;
obtaining second traffic data;
reconfiguring the first fee-based traffic zone as a reconfigured first fee-based traffic zone based on the second traffic data; and
monitoring the user equipment while the user equipment remains in the reconfigured first fee-based traffic zone.

17. The non-transitory machine-readable medium of claim 16, wherein the operations further comprise determining billing data for the user equipment based on a first result of the monitoring the user equipment within the first chargeable traffic zone and a second result of the monitoring the user equipment within the reconfigured first fee-based traffic zone.

18. The non-transitory machine-readable medium of claim 16, wherein the reconfiguring of the first fee-based traffic zone as the reconfigured first fee-based traffic zone comprises expanding an area corresponding to the first fee-based traffic zone to a larger area than the area corresponding to the reconfigured first fee-based traffic zone.

19. The non-transitory machine-readable medium of claim 16, wherein the reconfiguring of the first fee-based traffic zone as the reconfigured first fee-based traffic zone comprises contracting an area corresponding to the first fee-based traffic zone to a smaller area than the area corresponding to the reconfigured first fee-based traffic zone.

20. The non-transitory machine-readable medium of claim 16, wherein the second portion of the first fee-based traffic zone corresponds to a defined area around a residence associated with the second user identity.

* * * * *